(12) United States Patent
Hoerger

(10) Patent No.: US 8,582,246 B2
(45) Date of Patent: Nov. 12, 2013

(54) INDIVIDUALLY ADJUSTING A POSITION OF AN ACCESS HEAD ELEMENT ON A HEAD ASSEMBLY

(75) Inventor: Carl R. Hoerger, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 224 days.

(21) Appl. No.: 13/121,738

(22) PCT Filed: Oct. 15, 2008

(86) PCT No.: PCT/US2008/079933
§ 371 (c)(1),
(2), (4) Date: Mar. 30, 2011

(87) PCT Pub. No.: WO2010/044784
PCT Pub. Date: Apr. 22, 2010

(65) Prior Publication Data
US 2011/0182157 A1    Jul. 28, 2011

(51) Int. Cl.
*G11B 5/56* (2006.01)
(52) U.S. Cl.
USPC .......................................... 360/291

(58) Field of Classification Search
None
See application file for complete search history.

(56) References Cited

U.S. PATENT DOCUMENTS

| 6,018,434 A * | 1/2000 | Saliba .................. 360/77.13 |
| 6,243,350 B1 * | 6/2001 | Knight et al. ............ 369/126 |
| 2005/0099715 A1 | 5/2005 | Yip et al. |
| 2005/0168865 A1 | 8/2005 | Simmons, Jr. et al. |
| 2006/0066976 A1 | 3/2006 | Ohtsu |
| 2007/0230033 A1 | 10/2007 | McCallister et al. |
| 2008/0117543 A1 | 5/2008 | Bui et al. |
| 2011/0199702 A1 | 8/2011 | Hoerger |

OTHER PUBLICATIONS

International Search Report, PCT/US2008/079933, Jan. 30, 2009, 13 pages.

* cited by examiner

*Primary Examiner* — Joseph Feild
*Assistant Examiner* — Parul Gupta

(57) ABSTRACT

A tape storage device includes a head assembly having plural access head elements to access data on respective data tracks on a storage tape. A controller, responsive to information contained in at least one of the data tracks, is provided to individually adjust a lateral position of at least one of the access head elements independently of at least one other head element.

20 Claims, 2 Drawing Sheets

INDIVIDUALLY ADJUSTING A POSITION OF AN ACCESS HEAD ELEMENT ON A HEAD ASSEMBLY

TECHNICAL FIELD

The invention relates generally to individually adjusting a position of an access head element on a head assembly.

BACKGROUND

Various types of storage devices are available to store data for electronic devices. Examples of storage devices include tape storage devices, disk storage devices, integrated circuit (IC) storage devices, and others.

In a linear tape storage device, data is stored on plural data tracks of a storage tape, where the data tracks extend generally longitudinally along the storage tape. The reading and recording of data in the data tracks is accomplished by using a tape head assembly, which typically includes magnetic read/write head elements for reading/recording data in the data racks.

The storage tape is moved longitudinally with respect to the tape head assembly during the recording operation or read operation. Misalignment of head elements on the head assembly with respect to desired track positions (along corresponding data tracks) can result from various causes. For example, misalignment can be due to transverse (lateral) tape dimensional stability issues, such as storage tape dimensions varying due to temperature, humidity, creep, and tension. Variations in temperature and humidity can cause a storage tape to expand or contract, which can cause lateral misalignment between head elements and respective desired track positions. "Creep" refers to the tendency of a tape to return to a previous form, which can cause variations in dimensions of the tape that can lead to lateral misalignment. Tension applied on the tape can also cause dimensions of a tape to change. Increased tension can cause the width of the tape to decrease, while relaxed tension can allow the width of the tape to increase.

Misalignment can also result from mechanical causes; such as tape tilt (a storage tape traveling across a tape head assembly at an angle that is tilted with respect to a target longitudinal direction of travel), access head tolerances (variations in positions of access head elements caused by variations in manufacturing processes and equipment), or servo-writer head tolerances (variations in positions of servo information written into servo tracks due to variations of servo-writer head elements in the servo-writer equipment).

Lateral misalignment of head elements due to various causes can limit the density of tracks on a storage tape.

SUMMARY

In general, according to an embodiment, a tape storage device includes a head assembly having a plurality of access head elements to access data on respective data tracks on a storage tape. A controller is responsive to information contained in at least one of the data tracks to individually adjust a lateral position of at least one of the access head elements independently of at least one other head element.

Other or alternative features will become apparent from the following description, from the drawings, and from the claims.

BRIEF DESCRIPTION OF THE DRAWINGS

Some embodiments of the invention are described, by way of example, with respect to the following figures.

DETAILED DESCRIPTION

In accordance with some embodiments, a tape storage device is provided with a control mechanism to individually adjust lateral positions of access head elements (e.g., read head elements, write head elements) of a head assembly in the tape storage device. Adjusting the "lateral position" of an access head element refers to changing the position of an access head element in a direction that is transverse to the direction of motion of a storage tape (which is the longitudinal direction of the storage tape). Individually adjusting a lateral position of the access head element refers to adjusting the lateral position of the access head element independently of at least another one of the access head elements. In accordance with some embodiments, the lateral positions of access head elements are individually adjusted in response to servo information contained in data tracks of the storage tape. Normally, a data track is used to store data. The term "data" refers to user data, data associated with software applications, software instructions, or any other data that is distinguished from control information associated with a tape storage device to perform control or management tasks of the tape storage device that access the storage tape. In accordance with some embodiments, servo information is also provided in the data tracks to enable lateral positions of access head elements to be determined and adjusted.

Figure 1:
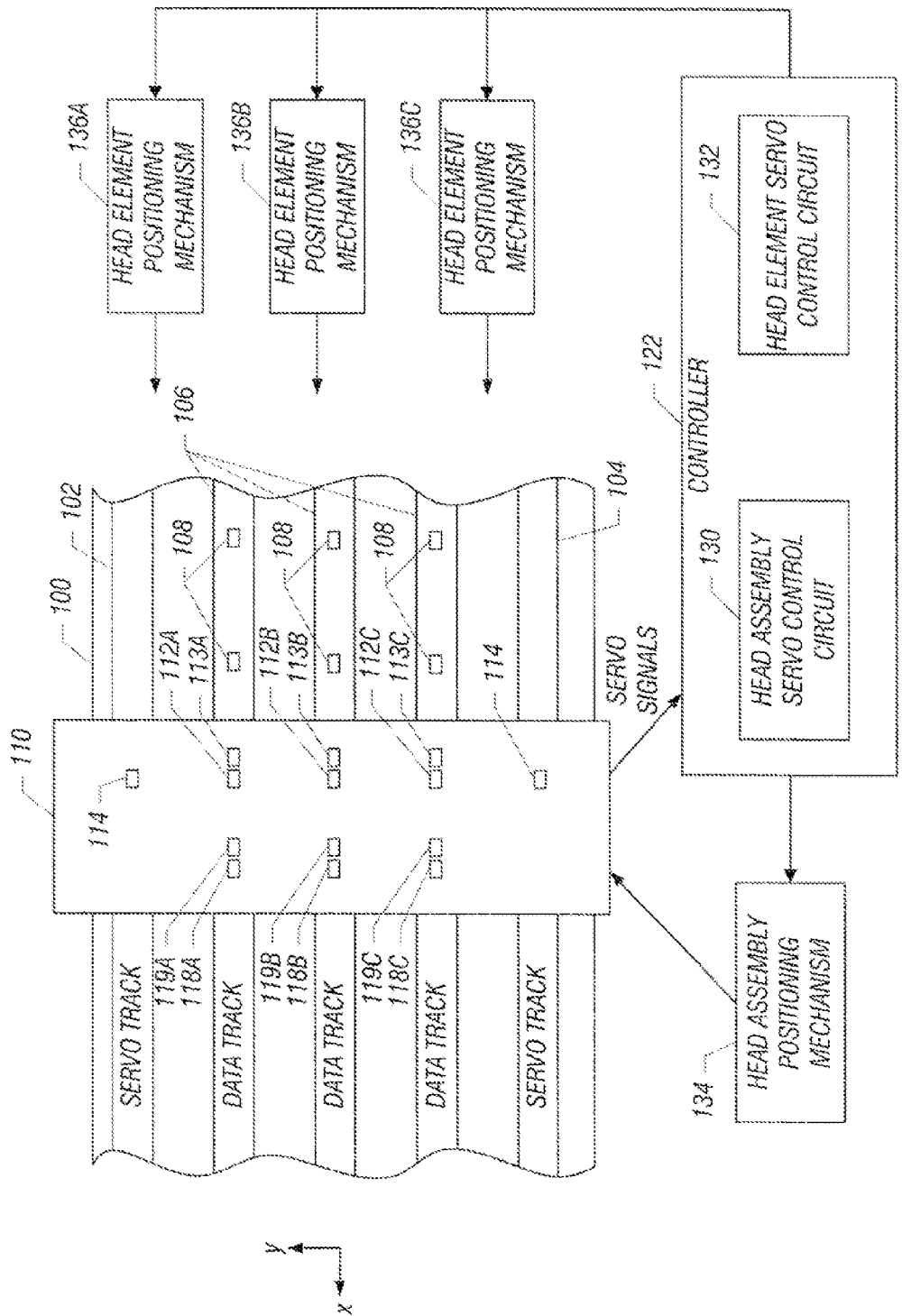
FIG. 1 is a schematic diagram of a portion of a tape storage device that incorporates an embodiment of the invention.

FIG. 1 shows a portion of an exemplary tape storage device that has a head assembly 110 for accessing a storage tape 100 that has servo tracks 102 and 104 and a number of data tracks 106. A "storage tape" refers to a storage medium (magnetic, optical, etc.) that moves linearly to allow data to be read from or recorded to the storage medium. Although just two servo tracks 102 and 104 are depicted on the storage tape 100, it is noted that in alternative implementations, less or more servo tracks can be used.

In accordance with some embodiments, in addition to storing data in the data tracks 106, at least one of the data tracks 106 is also further able to include servo information 108 interspersed with the data and provided at various locations along the length of the data track 106. For example, the servo information 108 can be provided in short intermittent bursts along the length of the data track 106. Alternatively, the servo information 108 can be initially written continuously along the data track 106, with portions of the servo information overwritten with actual data during operation of a tape storage device. The portions of the continuous servo information that remain in the data track 106 would appear as intermittent bursts of servo information 108 along the data track. As yet another implementation, the servo information can be placed at the beginning and/or end of the storage tape 100 and/or as a single section in the middle of the data track.

The servo information 108 that can be recorded onto the data tracks 106 can be timing-based servo information. Timing-based servo information includes servo patterns in the form of servo stripes. The servo stripes can have different angular orientations (also referred to as azimuthal orientations), with repeating patterns of servo stripes recorded as the servo information 108 in a data track 106 in FIG. 1. During an access operation (read or write operation), a read head element is able to read the servo information 108 on the data track 106 for deriving various distance information (corresponding to distances between various arrangements of servo stripes) to determine the lateral position of the read head element over the data track. An alternate embodiment is the use of amplitude-based servo marks.

It is noted that the same type of timing-based servo information can also be recorded in the servo tracks 102 and 104 of the storage tape 100 of FIG. 1.

As further depicted in FIG. 1, the head assembly 110 provided over the storage tape 100 has a number of read head elements 112A, 112B, 1120 (collectively or individually referred to as 112) positioned over respective data tracks 106 of the storage tape 100. The head assembly 110 extends laterally across the width of the storage tape 100, with the read head elements 112A, 112B, 112C arranged as an array along the lateral direction (direction y transverse to the longitudinal direction x) for positioning over the respective data tracks 106.

The head assembly 110 further includes an array of write head elements 118A, 118B, and 118C (individually or collectively referred to as 118) to record data onto corresponding data tracks 106.

A controller 122 in the tape storage device includes a head assembly servo control circuit 130 and a head element servo control circuit 132. The head assembly servo control circuit 130 receives servo signals produced by servo head elements 114 based on reading servo information contained in the servo tracks 102, 104. In response to the servo signals from the servo head elements 114, the head assembly control circuit 130 provides control signals to a head assembly positioning mechanism 134 to cause the head assembly positioning mechanism 134 to adjust the lateral position of the entire head assembly 110.

In accordance with some embodiments, the head element servo control circuit 132 is responsive to servo signals based on servo information contained in the data tracks 106. In response to such servo signals, the head element servo control circuit 132 provides control signals to head element positioning mechanisms 136 (136A, 136B, 136C shown) that are able to individually adjust the lateral positions of corresponding read head elements 112A, 112B, and 112C. Note that "individually adjusting" a lateral position of a read head element can refer to either adjusting the lateral position of just one read head element, or alternatively, adjusting the lateral position of a read head element along with at least one other read head element in a subset, where the subset is less than all the read head elements on the head assembly 110. In other words, individually adjusting a lateral position of a read head element means that the lateral position of the read head element alone or in combination with one or more other read head elements can be adjusted independent of at least one other read head element.

In some implementations, the head assembly servo control circuit 130 is a high bandwidth servo control circuit that is able to respond to servo signals of relatively high frequencies (e.g., greater than 500 Hertz). On the other hand, the head element servo control circuit 132 is a low bandwidth servo control circuit that is able to respond to servo signals of relatively low frequencies (e.g., less than 200 Hertz or between 1-10 Hertz). Effectively, the lateral position of the head assembly 110 can be adjusted more frequently than the lateral positions of the individual head elements.

Note that in some embodiments, when the lateral position of a given read head element is adjusted, the corresponding write head element is adjusted together with the given read head element. For example, if the lateral position of the read head element 112A is changed, then the lateral position of the corresponding write head element 118A is also changed together with the read head element 112A. This is due to the fact that the read head element 112A and write head element 118A perform read and write operations, respectively, with respect to the same data track 106, such that an adjustment of a lateral position of the read head element would mean that the lateral position of the write head element should also be adjusted, such as by the same amount.

In some other embodiments, the head element positioning mechanism 136 may not be able to adjust the lateral positions of both the read head element and write head element together. In such embodiments, after the lateral position of the read head element has been adjusted, the head element servo control circuit 132 can perform a correlation technique that determines the relative position of the write head element relative to the corresponding read head element whose position has just been adjusted. This correlation technique then can perform an adjustment of the lateral position of the write head element to align the pair of read head element and write head element.

In some implementations, the correlation technique is accomplished by using read head elements 119A-119C arranged on the same bump as the write head elements 118A-118C. FIG. 1 depicts a two-bump head assembly 110, which has bump 1 including write head elements 118A-118C and associated read head elements 119A-119C, and bump 2 including read head elements 112A-112C and associated write head elements 113A-113C. Effectively, each bump has matching read head elements and write head elements, such that four head elements per data track are provided in the depicted embodiment. During a write operation when the write head elements 118A-118C are active, there is quite a bit of electrical interference on the read head elements 119A-119C on the same bump (bump 1); as a result, the read head elements 119A-119C are inactive when write head elements 118A-118C are active. Normally, during a write, the data track is written with the write head elements 118A-118C on bump 1, and the written data is immediately read back with the read head elements 112A-112C on bump 2 (assuming a right-to-left direction of motion of the storage tape 100). This react back operation constitutes a read-verify or read-after-write operation to check that data is written correctly (to ensure no defects). During a normal data read operation, only the read head elements of one of bump 1 and bump 2 are used.

To perform the correlation technique according to some embodiments as noted above, as the head assembly 110 passes over the data section of the data tracks 106, a write head element (e.g., 118A on bump 1) is writing data to the corresponding data track so that the corresponding read head element 119A on bump 1 is turned off. However, as soon as bump 1 passes over the servo section of the data tracks 106, the write head element 118A on bump 1 is turned off and the read head element 119A on bump 1 is turned on to read the servo information. The head element servo control circuit 132 in the controller 122 is then used to adjust the read head element 119A (along with the write head element 118A on the same bump) so that the write head element 118A is centered over the data track.

To do this, the controller 122 uses a previously determined offset between the write head element 118A and read head element 119A obtained during initial calibration. The amount of adjustment of the write head element 118A determined using the above technique allows the controller 122 to determine the correlation between the lateral position of the write head element 118A on bump 1 with the lateral position of the read head element 112A on bump 2. The same technique is applied to correlate the other pairs of write head elements 118B-118C and read head elements 112B-112C.

The above discussion assumes a merged head assembly in which the read head element and write head element on the same bump are designed to be at the same (or close to the same) lateral position on the bump such that the read and write head elements on the same bump are designed to be centered on the corresponding data track. Another type of head assembly is an interleaved head assembly, in which the read head element and associated write head element on a given bump are side-by side in the lateral direction, so when one is centered on the data track, the other is completely off the data track. However, the read head element on bump 1 is aligned (laterally) with the write head element on bump 2, and the write head element on bump 1 is aligned (laterally) with the read head element on bump 2. In this case, the approach of correlating lateral positions of read and write head elements is similar to that discussed above, except that the offset in the position of the read head element and the position of the write head element on the same bump has to be considered.

Figure 2:
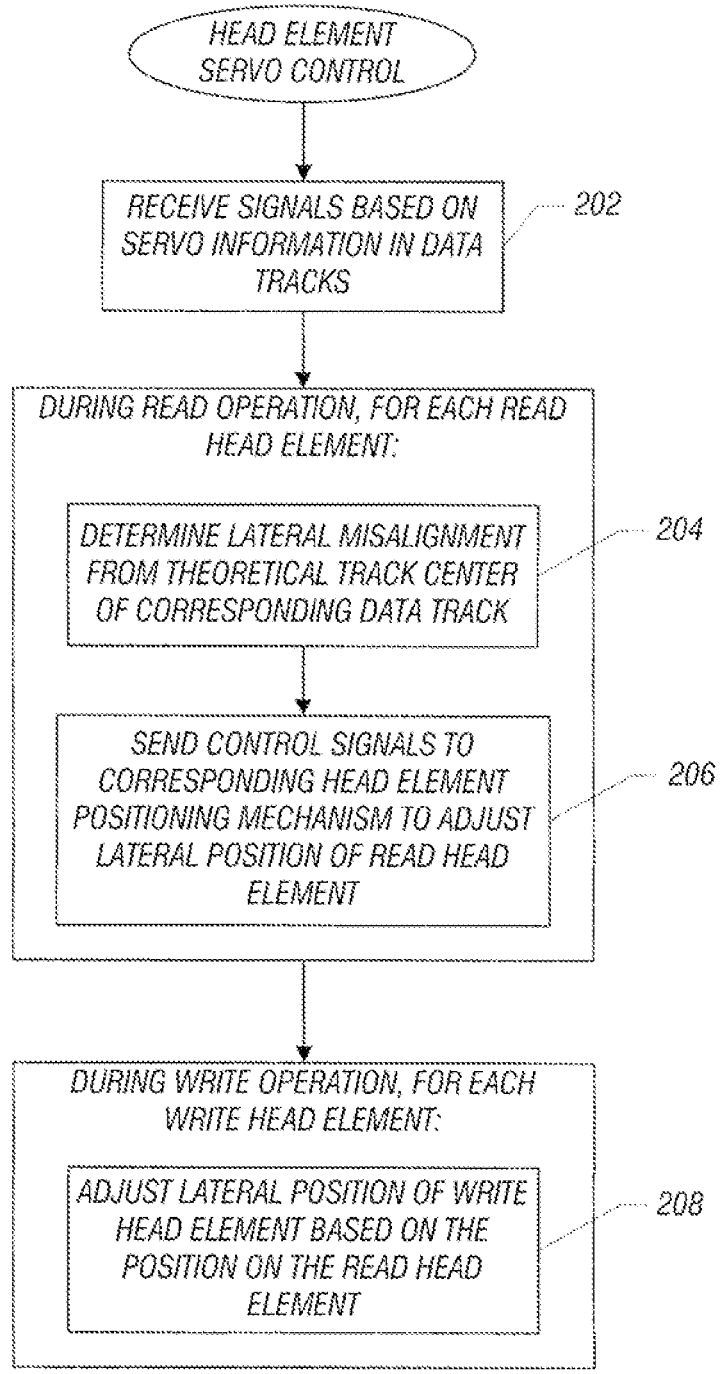
FIG. 2 is a flow diagram of a process of individually adjusting lateral positions of access head elements, in accordance with an embodiment.

FIG. 2 illustrates a procedure performed by the head element servo control circuit 132. The head element servo control circuit 132 receives (at 202), from read head elements 112, servo signals based on servo information contained in the data tracks 106 (FIG. 1). Then, during a read operation, for each read head element 112, the head element servo control circuit 132 determines (at 204) a lateral misalignment from a theoretical longitudinal center of the corresponding data track. If a misalignment is detected, then the head element servo control circuit 132 sends (at 206) control signals to the corresponding head element position mechanism 136 to individually adjust the lateral position of the corresponding read head element to seek to center the read head element at a theoretical data track center position.

During a write operation, for each write head element 118, the lateral position of the write head element 118 is adjusted (at 208) based on the position of the corresponding read head element. As noted above, in one embodiment, the lateral positions of the read head element and write head element are adjusted together. Note that an appropriate lateral offset may have to be maintained between the write head element and the corresponding read head element, based on head calibration performed at the factory or in the field. Alternatively, a correlation technique can be applied to determine the adjustment of the lateral position of the write head element relative to the read head element, as discussed above.

Note that while the low bandwidth lateral position individual adjustment of access head elements is being performed by the head element servo control circuit 132 according to FIG. 2, the head assembly servo control circuit 130 can perform high bandwidth lateral position adjustment of the head assembly 110.

The ability to individually adjust the lateral positions of access head elements has the effect of eliminating positioning errors of each data track caused by various misalignment causes, including environmental conditions that can cause tape expansion or contraction, tape creep, tension variation, tape tilt, head tolerances, servo-write head tolerances, and so forth.

Moreover, by using techniques and mechanisms according to some embodiments to eliminate head-track misalignment due to various misalignment causes, margins that would have to be provided in data tracks to account for such misalignments can be reduced. As a result, head elements on a tape head assembly can be moved closer together in the lateral direction, which increases track density on a storage tape.

Increasing track density means that a larger amount of data can be stored on a storage tape (assuming the same storage tape size), and higher bandwidth read and write operations can be performed (since a greater number of data tracks can be read or written at the same time).

The controller 122 depicted in FIG. 1 can be implemented as hardware to perform various tasks discussed above. Alternatively, the controller 122 can be implemented as a combination of software and hardware to perform various tasks discussed above. For example, in the latter scenario, the controller 122 can include a processor that is able to execute software instructions to perform the tasks. The processor can include a microprocessor, a microcontroller, a processor module or subsystem (including one or more microprocessors or microcontrollers), or other control or computing device. A "processor" can refer to a single component or to plural components.

Instructions of the software can be stored in a storage device, which is implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components. The instructions can be stored as drive firmware in flash memory within a tape storage device, for example.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations.

What is claimed is:

1. A tape storage device comprising:
   a head assembly having a plurality of access head elements to access data on respective data tracks on a storage tape; and
   a controller, responsive to information contained in at least one of the data tracks, to individually adjust a lateral position of at least one of the access head elements independently of at least one other head element.

2. The tape storage device of claim 1, wherein the information contained in the at least one data track comprises servo information interspersed with data in the data track.

3. The tape storage device of claim 2, wherein the servo information in the at least one data track includes either timing based servo information or amplitude-based servo information.

4. The tape storage device of claim 1, wherein the head assembly further comprises a servo head element to read a servo track on the storage tape, the servo track separate from the data.

5. The tape storage device of claim 4, wherein the controller is to further adjust a lateral position of the head assembly in response to servo information in the servo track, wherein adjusting the lateral position of the head assembly causes the lateral positions of the plurality of access head elements to be adjusted together.

6. The tape storage device of claim 5, wherein the controller includes:
a higher bandwidth servo control circuit to adjust the lateral position of the head assembly based on the servo information in the servo track; and
a lower bandwidth servo control circuit to individually adjust the lateral position of the at least one access head element.

7. The tape storage device of claim 6, wherein the higher bandwidth servo control circuit is to perform lateral position adjustment in response to servo signals having a frequency greater than 500 Hertz, and
wherein the lower bandwidth servo control circuit is to perform lateral position adjustment in response to servo signals having a frequency less than 200 Hertz.

8. The tape storage device of claim 1, wherein the access head elements comprise read head elements, and wherein the head assembly further includes write head elements,
wherein the control circuit is to adjust the lateral position of the at least one read head element together with a corresponding one of the write head elements.

9. The tape storage device of claim 1, wherein the access head elements comprise read head elements, and wherein the head assembly further includes write head elements,
wherein the controller is to further apply a correlation technique to determine an adjustment of a lateral position of a corresponding one of the write head elements.

10. The tape storage device of claim 1, wherein the controller is responsive to information contained in another one of the data tracks to individually adjust a lateral position of another one of the access head elements.

11. The tape storage device of claim 1, wherein the controller is to adjust the lateral position of the at least one access head element by seeking to center at least one access head element over a track center of the at least one data track.

12. A method of correcting positioning of a first access head element from among plural access head elements of a head assembly in a tape storage device, comprising:
reading servo information from a first of plural data tracks on a storage tape, wherein the plural data tracks are distinct from servo tracks on the storage tape; and
in response to the servo information, individually adjust a lateral position of the first access head element relative to the first data track, wherein the lateral position of the first access head element is adjusted independently of at least another one of the plural access head elements.

13. The method of claim 12, further comprising:
reading servo information from the servo tracks; and
adjusting a lateral position of the head assembly in response to the servo information in the servo tracks, wherein adjusting the lateral position of the head assembly causes the lateral positions of the plural access head elements to be adjusted together.

14. A controller for use in a tape storage device, comprising:
a servo control circuit to:
receive signals representative of servo information from a data track in a storage tape, wherein the data track further contains data; and
cause a lateral position of a first access head element of a head assembly of the tape storage device to be individually adjusted relative to the data track, wherein the individual adjustment of the lateral position of the first access head element is independent of an adjustment of a lateral position of another access head element of the head assembly.

15. The controller of claim 14, wherein the first access head element comprises a read head element to read data on the data track, and wherein the servo control circuit is to further adjust a lateral position of a write head element based on the position of the read head element, wherein the write head element is to record data onto the data track.

16. The tape storage device of claim 1, wherein individually adjusting the lateral position of the at least one access head element comprises changing a lateral position of a first of the plurality of access head elements independently of a change of a lateral position of a second of the plurality of access head elements.

17. The tape storage device of claim 16, wherein an amount of the change of the lateral position of the first access head element is different from an amount of the change of the lateral position of the second access head element.

18. The method of claim 12, wherein individually adjusting the lateral position of the first access head element comprises changing the lateral position of the first access head element independently of a change of a lateral position of at least the another access head element.

19. The method of claim 18, wherein an amount of the change of the lateral position of the first access head element is different from an amount of the change of the lateral position of at least the another access head element.

20. The controller of claim 14, wherein the individual adjustment of the lateral position of the first access head element comprises changing the lateral position of the first access head element independently of a change of the lateral position of the second access head element.

* * * * *

UNITED STATES PATENT AND TRADEMARK OFFICE
CERTIFICATE OF CORRECTION

| | | |
|---|---|---|
| PATENT NO. | : 8,582,246 B2 | Page 1 of 1 |
| APPLICATION NO. | : 13/121738 | |
| DATED | : November 12, 2013 | |
| INVENTOR(S) | : Carl R. Hoerger | |

It is certified that error appears in the above-identified patent and that said Letters Patent is hereby corrected as shown below:

In the Claims:

In column 6, line 66, in Claim 3, delete "timing based" and insert -- timing-based --, therefor.

Signed and Sealed this
Twenty-fifth Day of February, 2014

Michelle K. Lee
*Deputy Director of the United States Patent and Trademark Office*